Figure 1:
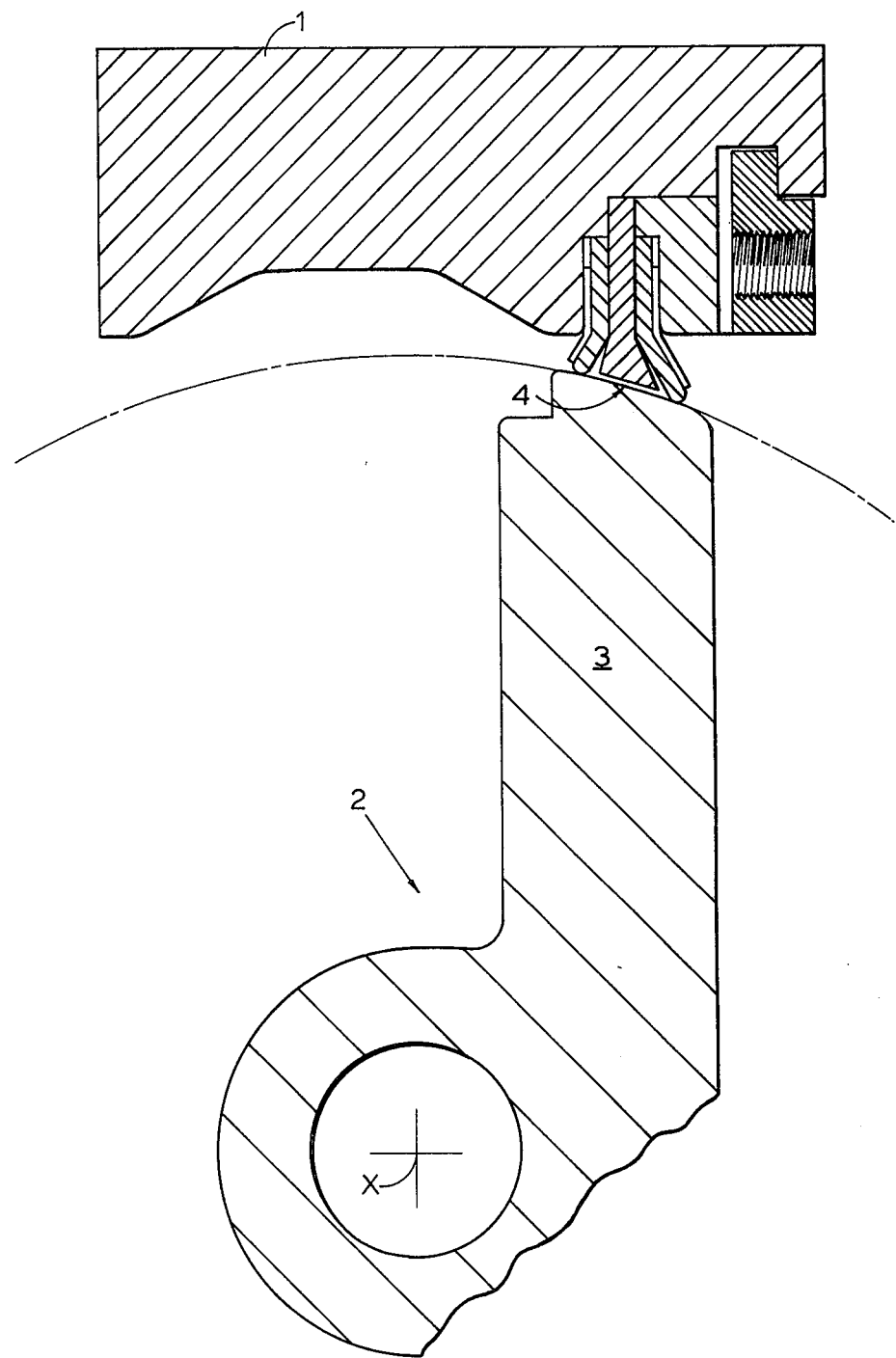

United States Patent [19]

Snape

[11] 4,244,387

[45] Jan. 13, 1981

[54] ROTARY VALVE WITH TEMPERATURE RESPONSIVE SEAL MEANS

[75] Inventor: Christopher J. Snape, Halesowen, England

[73] Assignee: Charles Winn (Valves) Limited, London, England

[21] Appl. No.: 958,660

[22] Filed: Nov. 8, 1978

[30] Foreign Application Priority Data

Nov. 8, 1977 [GB] United Kingdom ............... 46358/77

[51] Int. Cl.³ ............................................. F16K 1/226
[52] U.S. Cl. ..................................... 137/72; 251/173; 251/306
[58] Field of Search ................................. 137/72–77; 251/173, 306, 307, 308

[56] References Cited

U.S. PATENT DOCUMENTS 3,174,495  3/1965  Anderson et al. ..................... 137/74

FOREIGN PATENT DOCUMENTS 2524895  12/1975  Fed. Rep. of Germany ........... 251/307
2279992  2/1976   France ........................................ 137/72
45/32861 10/1970  Japan ....................................... 251/306

Primary Examiner—Martin P. Schwadron
Assistant Examiner—Richard Gerard
Attorney, Agent, or Firm—Scrivener, Parker, Scrivener and Clarke

[57] ABSTRACT

In a butterfly valve, comprising a valve disk pivotally mounted for movement between a closed position, in which the disk prevents the passage of fluid along a passageway, and an open position, in which the passage of fluid is allowed, an annular seal is provided to seal between the periphery of the disk and the wall of the passageway, provided by a valve housing, when the disk is in its closed position. The seal comprises two deformable sealing members, of P.C.T.F.E., mounted to seal against fluid flow in either direction along the passageway. A rigid former or rigid support ring is mounted between the sealing members to provide support therefor, and to act as a back-up seal in case fire should destroy the primary sealing members. In order that the former can be effective as a seal, it is clamped between the valve housing and a clamping ring independently of the fire-destructible primary sealing members. In the event of a fire, the former remains securely clamped upon destruction of the sealing members, and the valve disk can be moved into engagement with the former to effect a seal.

3 Claims, 2 Drawing Figures

ROTARY VALVE WITH TEMPERATURE RESPONSIVE SEAL MEANS

BACKGROUND OF THE INVENTION

There has been proposed, in French Patent Specification No. 2,279,992, a seal for a butterfly valve which comprises two sealing elements of a deformable material for sealing against the periphery of the valve disk. A rigid former is mounted between the two sealing elements, to support the elements and control their engagement with the disk, the former being clamped together with the sealing elements between a portion of the valve housing and a clamping ring. The two sealing elements are arranged so that the seal is effective against flow in either direction through the valve.

For some applications, for example for uses in the petrochemical industry, there is a requirement that a rotary valve can in the event of a fire still be closed to prevent flow along a pipeline. In rotary valves it is known to use seals of materials, such as materials based upon polytetrafluoroethylene (P.T.F.E.), which may be destroyed in the event of a serious fire, and provision must accordingly be made for a fireproof back-up seal which would survive a fire of the expected intensity.

Such valves are known as 'fire-safe valves' and meet well known standards such as British Standard No. 5146.

With a seal as shown in Specification No. 2,279,992, upon destruction of the sealing elements in a fire, the former, since it is clamped together with the sealing elements, would be left unclamped, and accordingly could not be employed to provide a reliable back-up seal.

SUMMARY OF THE INVENTION

It is an object of this invention to provide a rotary valve with a seal which seals against flow through the valve in either direction, and which comprises a fireproof member which can serve as a back-up seal, against which the valve member can be moved to effect a seal, should the primary sealing elements be destroyed by fire.

In accordance with the invention a rotary valve comprises a valve housing defining a passageway through which fluid is to pass, a valve member pivotally mounted within the housing for movement between a closed position, in which it prevents the flow of fluid along the passageway, and an open position in which the flow of fluid is allowed, and an annular seal mounted on the valve housing to seal between a peripheral surface of the valve member and a wall of the passageway when the valve member is in its closed position, the seal comprising first and second annular sealing elements, arranged to seal against flow along the passageway in either direction, and a rigid support ring mounted between the two sealing elements, the support ring being clamped to the valve housing independently of the two sealing elements, so that in the event of loss of the sealing elements the support ring would remain clamped in position.

In a preferred construction an outer peripheral portion of the support ring extends radially beyond the two sealing elements to be clamped to the valve housing independently of the sealing elements.

In the event of a serious fire which destroys the two sealing elements, the support ring, since it is independently clamped, will remain secure and the valve member can be moved up against it to effect a seal.

There now follows a detailed description, to be read with reference to the accompanying drawings, of one embodiment to the invention which is described by way of example.

Figure 2:
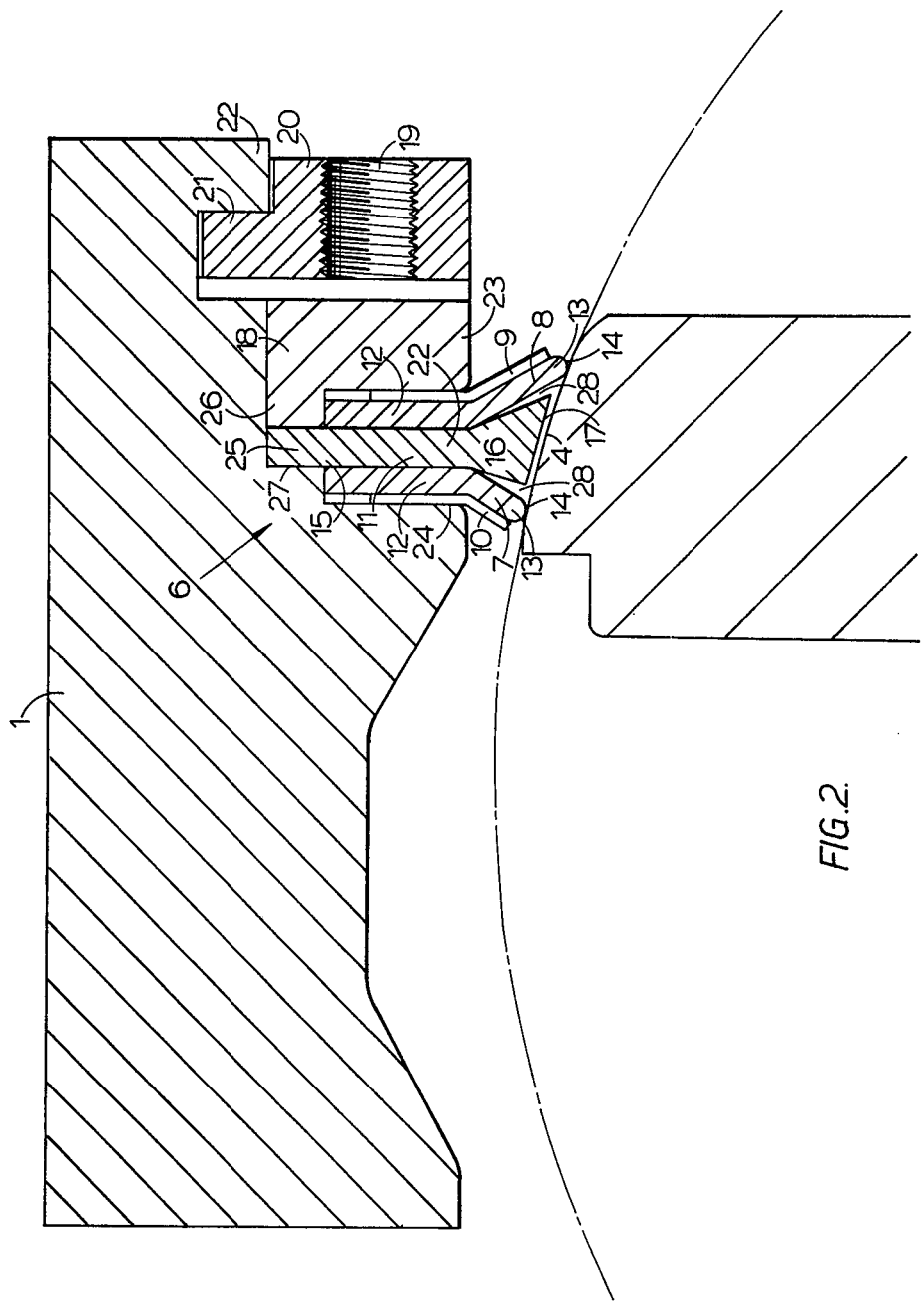

In the drawings:

FIG. 1 is a cross-sectional partial view of a butterfly valve for cryogenic use with the valve disk shown in the closed position; and FIG. 2 is a view, similar to FIG. 1, showing the annular seal on a larger scale.

The valve comprises a valve housing 1 defining a passageway through which fluid is to pass. Only part of the valve housing 1 is shown in FIGS. 1 and 2 of the drawings. A valve member 2 provides a circular valve disk 3 which is pivotally mounted within the housing for movement between a closed position, in which it prevents the flow of fluid along the passageway, and an open position in which the flow of fluid is allowed. The disk 3 is displaced from the pivotal axis X of the valve member. The periphery 4 of the disk 3, is defined, as is usual, by an annular portion of a sphere about the midpoint of the axis X. The housing 1 is formed within an annular recess provided with a plurality of steps and in which is clamped an annular seal assembly 6 comprising primary sealing members in the form of first and second annular sealing elements, 7 and 8 respectively, first and second resilient annular metal bands, 9 and 10 respectively, and a back-up sealing member in the form of a fireproof, rigid metal, support ring 11. The annular seal assembly 6 is so mounted on the valve housing to seal between the periphery 4 of the valve disk and and a wall of the passageway when the disk is in its closed position.

The seals 7 and 8 are moulded from poly chloro trifluoro ethylene (P.C.T.F.E.) and each comprises a clamped portion 12 and an unclamped portion 13 with an obtuse angle being defined between the two portions, even before incorporation of the seals into the seal assembly.

The resilient bands 9 and 10 are each of a similar shape to the respective seal but the clamped limbs of the bands are of shorter radial length than the radial length of the clamped seal portions 12, and the obtuse angle between the two bands in the relaxed state of the bands is greater than the corresponding angle of the unstressed seals, so that on assembly the rounded radially inner edges 14 of the seals are urged towards each other by the resilient forces of the bands. The bands are of austemperised stainless steel.

The support ring 11 comprises a clamped disk portion 15 and an unclamped portion 16 of substantially triangular transverse cross-section. The radially inner face 17 of the unclamped portion 16 is closely spaced from the edge 4 of the disk 3 and is parallel to a tangent to the edge 14.

The seal assembly is clamped in the recess in the housing by a clamping ring 18 of L-shape in cross-section which is retained in place by a series of circumferentially spaced clamping screws, not shown, which threadedly pass through holes 19 formed in a castellated ring 20 of which the castellations 21 are received behind radially inwardly directed castellations 22 on the housing. The clamping screws urge the clamping ring 18 to the left in the drawings so that a radially inner annual part 22 of the disk portion 15 of the support ring, together with the seal portions 12 and bands 9, is clamped between the longer limb 23 of the clamping ring 18 and face 24 of the housing recess.

An outer peripheral portion 25 of the disk portion 15 of the support ring extends radially beyond the two sealing elements 7 and 8, and is clamped, independently of the two sealing elements, between the step provided by the free end of the shorter limb 26 of the clamping ring 18 and a face 26 of a step on the housing.

It will be seen that the unclamped portions 13 of the seals 7 and 8 are inclined in opposite directions at acute angles to the edge 4 of the disk with which the seal edges 14 seal so that increased fluid pressure applied to the rightwardly facing side of seal 8, or to the leftwardly facing side of seal 7, will result in an increased force being applied between the corresponding sealing edge 14 and the disk. In this way the sealing elements 7 and 8 are arranged to seal against flow along the passageway in either direction.

Wedge-shaped gaps 28 are defined between the unclamped portions 13 of the seals and the respectively adjacent faces of the unclamped portion 16 of the support ring, and the roots of the gaps 28 lie at the junction between the unclamped portion 16 of the support ring and the clamped disk portion 15.

The wedge-shaped gaps 28 permit substantial deflection of the unclamped portions 13 of the seals towards the support ring 11 before engagement occurs, and hence a substantial increase in the sealing force at the edge 14 results from an increase in the pressure differential. The gap 28 is made of sufficient width, and the thickness, and hence the resistance to deflection, of the seal portions 13 is chosen to ensure that the seal portions 13 only engage with the support 11 in the event of a pressure surge or high fluid velocity.

The disk 3 and the support ring 11 are made of materials having the same coefficient of thermal expansion to ensure that the gap between them is maintained at a substantially constant value for the range of working temperatures.

The disk 3 can be located for pivotal movement by members made of P.T.F.E. (polytetrafluoroethylene) so that in the event of a fire the P.T.F.E. members are destroyed and the valve disk is able to move axially along the passageway to seat against the face 17 of the support ring 11. Since the outer peripheral portion 25 of the support ring remains firmly clamped even when the sealing elements 7 and 8 are destroyed the valve is still effective substantially to prevent fluid flow. Fluid cannot readily pass around the clamping peripheral portion 25.

It is to be understood that although in the embodiment described the sealing elements are of a P.C.T.F.E. material, the invention is not so limited and may find application where sealing elements of other firedestructible materials are used. Similarly the support ring can be of any material that is suitable for its role, and in particular is sufficiently fireproof to withstand any expected fire intensity.

I claim:

1. A rotary valve comprising a valve housing defining a passageway through which fluid is passed, a valve member pivotally mounted within the housing for movement between a closed position, in which it prevents the flow of fluid along the passageway, and an open position in which the flow of fluid is allowed, and an annular seal mounted on the valve housing to seal between a peripheral surface of the valve member and the wall of the passageway when the valve member is in its closed position, the seal comprising first and second annular sealing elements, arranged to seal against flow along the passageway in either direction, and a rigid support ring mounted between the two sealing elements, the support ring being clamped to the valve housing independently of the two sealing elements, so that in the event of loss of the sealing elements the support ring would remain clamped in position, and the valve member being movable, in the event of a fire which destroys the sealing elements, along the passageway in its closed position until its peripheral surface engages the support ring so that a seal is again formed to prevent the flow of fluid along the passageway.

2. A valve according to claim 1 in which an outer peripheral portion of the support ring extends radially beyond the two sealing elements to be clamped to the valve housing independently of the sealing elements.

3. A valve according to claim 1 in which the annular seal is clamped against the housing by means of a clamping ring, the housing and the clamping ring each comprising an annular step portion, and said peripheral portion of the support ring being clamped between the two step portions.

* * * * *